(12) United States Patent
Okada et al.

(10) Patent No.: US 11,808,279 B1
(45) Date of Patent: Nov. 7, 2023

(54) CENTRIFUGAL COMPRESSOR

(71) Applicant: DAIKIN INDUSTRIES, LTD., Osaka (JP)

(72) Inventors: Kuuma Okada, Osaka (JP); Hideki Fujiwara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/955,256

(22) Filed: Sep. 28, 2022

Related U.S. Application Data

(63) Continuation of application No. PCT/JP2021/005843, filed on Feb. 17, 2021.

(30) Foreign Application Priority Data

Mar. 31, 2020 (JP) ................................. 2020-062132

(51) Int. Cl.
*F04D 29/058* (2006.01)
*F04D 29/62* (2006.01)
(Continued)

(52) U.S. Cl.
CPC ......... *F04D 29/058* (2013.01); *F04D 29/051* (2013.01); *F04D 29/624* (2013.01); *F16C 32/044* (2013.01); *F16C 32/0406* (2013.01)

(58) Field of Classification Search
CPC .. F16C 32/044; F16C 32/0406; F04D 29/624; F04D 29/051; F04D 29/058
See application file for complete search history.

(56) References Cited

U.S. PATENT DOCUMENTS

2009/0015012 A1* 1/2009 Metzler ................. F04D 29/051
  415/173.1
2013/0318797 A1* 12/2013 Royal ..................... F04D 27/02
  29/898.041
(Continued)

FOREIGN PATENT DOCUMENTS

CN     113597515 A   * 11/2021
EP     4 108 947 A1    12/2022
(Continued)

OTHER PUBLICATIONS

International Search Report of corresponding PCT Application No. PCT/JP2021/005843 dated Apr. 6, 2021.
(Continued)

*Primary Examiner* — Forrest M Phillips
(74) *Attorney, Agent, or Firm* — Global IP Counselors, LLP

(57) ABSTRACT

A centrifugal compressor includes a tubular shape casing extending in an axial direction, a motor stator fixed to an inside of the casing in a radial direction, a shaft disposed inside of the motor stator in the radial direction and extending in the axial direction, a motor rotor fixed to the shaft and facing the motor stator with a gap in the radial direction, a compression unit fixed to an end portion of the shaft on one side in the axial direction, a first thrust magnetic bearing disposed between the motor rotor and the impeller in the axial direction, and a second thrust magnetic bearing disposed on an other side in the axial direction relative to the motor rotor. A magnetic attraction force of the second thrust magnetic bearing toward the other side is larger than a magnetic attraction force of the first thrust magnetic bearing toward the one side.

3 Claims, 2 Drawing Sheets

(51) Int. Cl.
*F04D 29/051* (2006.01)
*F16C 32/04* (2006.01)

(56) References Cited

U.S. PATENT DOCUMENTS

| | | | | |
|---|---|---|---|---|
| 2018/0087516 A1* | 3/2018 | Osama | ................ | F04D 13/0646 |
| 2021/0010536 A1* | 1/2021 | Yamasuso | ............. | F04D 29/058 |
| 2021/0108646 A1* | 4/2021 | Nakazawa | .......... | F16C 32/0489 |

FOREIGN PATENT DOCUMENTS

| | | | |
|---|---|---|---|
| JP | 2013-50180 A | | 3/2013 |
| JP | 2014-231827 A | | 12/2014 |
| JP | 2019-173823 A | | 10/2019 |
| WO | WO-2020168749 A1 | * | 8/2020 |

OTHER PUBLICATIONS

International Preliminary Report of corresponding PCT Application No. PCT/JP2021/005843 dated Oct. 13, 2022.
European Search Report of corresponding EP Application No. 21 78 1579.4 dated Aug. 14, 2023.

* cited by examiner

CENTRIFUGAL COMPRESSOR

CROSS-REFERENCE TO RELATED APPLICATIONS

This is a continuation of International Application No. PCT/JP2021/005843 filed on Feb. 17, 2021, which claims priority to Japanese Patent Application No. 2020-062132, filed on Mar. 31, 2020. The entire disclosures of these applications are incorporated by reference herein.

BACKGROUND

Technical Field

The present disclosure relates to a centrifugal compressor.

Background Art

To date, a centrifugal compressor including a plurality of thrust magnetic bearings that are arranged with a gap therebetween in the axial direction is known. For example, Japanese Unexamined Patent Publication No. 2019-173823 (in particular, paragraphs 0027 to 0032) describes a centrifugal compressor of this type. The centrifugal compressor disclosed in Japanese Unexamined Patent Publication No. 2019-173823 (in particular, paragraphs 0027 to 0032) includes a shaft, a rotor, a stator, an impeller, two radial magnetic bearings, and two thrust magnetic bearings. The rotor is fixed to the shaft so as to be coaxial with the shaft. The impeller is fixed to a front end portion of the shaft. The two radial magnetic bearings are disposed so as to face each other with the rotor (motor) interposed therebetween. One of the two thrust magnetic bearings is disposed between the impeller and one of the radial magnetic bearings on the front side in the axial direction, and the other thrust magnetic bearing is disposed on the rear side in the axial direction of the other radial magnetic bearing on the rear side.

SUMMARY

According to a first aspect of the present disclosure, a centrifugal compressor includes a casing having a tubular shape that extends in an axial direction, a motor stator fixed to an inside of the casing in a radial direction, a shaft disposed inside of the motor stator in the radial direction and extending in the axial direction, a motor rotor fixed to the shaft and facing the motor stator with a gap therebetween in the radial direction, a compression unit fixed to an end portion of the shaft on one side in the axial direction, a first thrust magnetic bearing disposed between the motor rotor and the impeller in the axial direction, and a second thrust magnetic bearing disposed on an other side in the axial direction relative to the motor rotor. The compression unit includes at least one impeller. A magnetic attraction force of the second thrust magnetic bearing toward the other side in the axial direction is larger than a magnetic attraction force of the first thrust magnetic bearing toward the one side in the axial direction. The first thrust magnetic bearing includes a first rotor coaxially fixed to the shaft, and a first stator fixed to an inside of the casing in the radial direction and positioned on the one side in the axial direction relative to the first rotor with a gap therebetween in the axial direction. The second thrust magnetic bearing includes a second rotor coaxially fixed to the shaft, and a second stator fixed to an inside of the casing in the radial direction and positioned on the other side in the axial direction relative to the second rotor with a gap therebetween in the axial direction. An outside diameter of the second rotor is larger than an outside diameter of the first rotor. The outside diameter of the first rotor is smaller than an inside diameter of the motor stator. The outside diameter of the second rotor is larger than the outside diameter of the motor stator.

DETAILED DESCRIPTION OF EMBODIMENT(S)

First Embodiment

A first embodiment of the present disclosure will be described.

Figure 1:
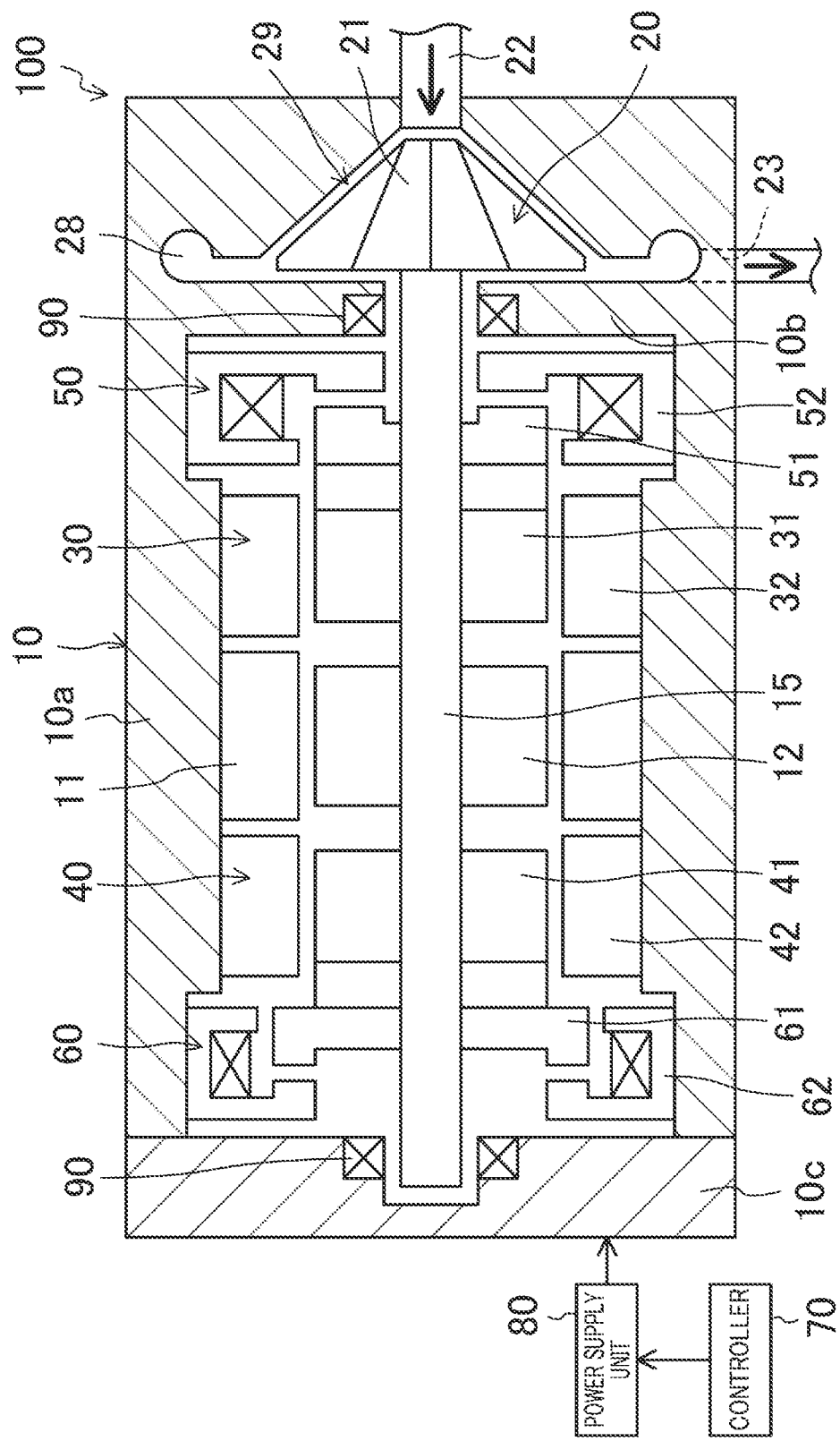
FIG. 1 is a schematic vertical sectional view of a centrifugal compressor according to a first embodiment.

Referring to FIG. 1, a centrifugal compressor (100) according to the present embodiment will be described. FIG. 1 is a schematic vertical sectional view of the centrifugal compressor (100) according to the first embodiment. In the following description, the direction in which a shaft (15) of the centrifugal compressor (100) extends may be referred to as the axial direction, the direction perpendicular to the axial direction may be referred to as the radial direction, and the direction along the circumference of the shaft (15) may be referred to as the circumferential direction. However, these definitions of the directions do not limit the orientation and the like of the centrifugal compressor (100) when the centrifugal compressor (100) is being assembled or used.

The centrifugal compressor (100) includes a casing (10), a motor stator (11), a shaft (15), a motor rotor (12), a compression unit (20), a first radial magnetic bearing (30), a second radial magnetic bearing (40), a first thrust magnetic bearing (50), a second thrust magnetic bearing (60), a controller (70), a power supply unit (80), and a touchdown bearing (90).

The casing (10) accommodates the other members of the centrifugal compressor (100). The casing (10) includes a body (10a), a wall (10b), and a closing portion (10c). The body (10a) is a substantially tubular member that extends in the axial direction. One side of the body (10a) in the axial direction is closed. A wall portion (10b) extends toward the inside in the radial direction from an inner peripheral surface of a part of the body (10a) on the one side in the axial direction. Thus, an impeller chamber (29) that accommodates an impeller (21) (described below) is formed in a part of the body (10a) on the one side in the axial direction relative to the wall (10b).

The other side of the body (10a) in the axial direction is open. The closing portion (10c) has a disk-like shape. The closing portion (10c) is superposed on the body (10a) from the other side in the axial direction. Thus, the other side of the body (10a) in the axial direction is closed.

The motor stator (11) has a cylindrical shape that extends in the axial direction. The motor stator (11) is fixed to an inside in the radial direction of the body (10a) of the casing (10). To be specific, an outer peripheral surface of the motor stator (11) is fixed to an inner peripheral surface of the body (10a).

The shaft (15) has a cylindrical shape that extends in the axial direction. The shaft (15) is disposed inside in the radial direction of the motor stator (11). The shaft (15) is a so-called motor shaft. The shaft (15) is disposed coaxially with the motor stator (11).

The motor rotor (12) has a cylindrical shape that extends in the axial direction. The motor rotor (12) is disposed inside in the radial direction of the motor stator (11) and outside in the radial direction of the shaft (15). The motor rotor (12) is coaxially fixed to the shaft (15). The outer peripheral surface of the motor rotor (12) faces an inner peripheral surface of the motor stator (11) with a gap therebetween in the radial direction.

In one of the motor stator (11) and the motor rotor (12), N-poles and S-poles of magnets are alternately arranged in the circumferential direction. In the other of the motor stator (11) and the motor rotor (12), a coil is provided. Due to interaction between magnetic flux and electric current between the motor stator (11) and the motor rotor (12), the motor rotor (12) rotates with respect to the motor stator (11).

The compression unit (20) is fixed to an end portion of the shaft (15) on the one side in the axial direction. To be specific, the compression unit (20) according to the present embodiment is one impeller (21). The impeller (21) has a substantially conical outer shape and includes a plurality of blades that are arranged in the circumferential direction. The impeller (21) is accommodated in the impeller chamber (29) on the one side in the axial direction relative to the wall (10*b*). A suction pipe (22) and a discharge pipe (23) are connected to the impeller chamber (29). A compression space (28) is formed in an outer peripheral portion of the impeller chamber (29). The suction pipe (22) is provided to guide a gas from the outside to the impeller chamber (29). The discharge pipe (23) is provided to return a high-pressure gas compressed in the impeller chamber (29) to the outside.

The first radial magnetic bearing (30) rotatably supports the shaft (15) in a non-contact manner by using an electromagnetic force. The first radial magnetic bearing (30) includes a first radial rotor (31) and a first radial stator (32). The first radial rotor (31) is positioned on the one side in the axial direction of the motor rotor (12) and on the other side in the axial direction relative to the compression unit. The first radial rotor (31) is coaxially fixed to the shaft (15). The first radial stator (32) is positioned on the one side in the axial direction of the motor stator (11). The first radial stator (32) is fixed to the inner peripheral surface of the body (10*a*). The first radial rotor (31) faces the first radial stator (32) with a gap therebetween in the radial direction.

The second radial magnetic bearing (40) rotatably supports the shaft (15) in a non-contact manner by using an electromagnetic force. The second radial magnetic bearing (40) includes a second radial rotor (41) and a second radial stator (42). The second radial rotor (41) is positioned on the other side in the axial direction relative to the motor rotor (12). The second radial rotor (41) is coaxially fixed to the shaft (15). The second radial stator (42) is positioned on the other side in the axial direction of the motor stator (11). The second radial stator (42) is fixed to the inner peripheral surface of the body (10*a*). The second radial rotor (41) faces the second radial stator (42) with a gap therebetween in the radial direction.

The first thrust magnetic bearing (50) pulls the shaft (15) toward the one side in the axial direction by using a magnetic attraction force. The first thrust magnetic bearing (50) is disposed between the motor rotor (12) and the compression unit (20) in the axial direction. To be more specific, the first thrust magnetic bearing (50) is positioned between the first radial rotor (31) and the impeller (21) in the axial direction. The first thrust magnetic bearing (50) includes a first thrust rotor (51) and a first thrust stator (52). The first thrust rotor (51) is positioned on the one side in the axial direction of the first radial rotor (31) of the first radial magnetic bearing (30). The first thrust rotor (51) is coaxially fixed to the shaft (15). The first thrust stator (52) is positioned on the one side in the axial direction of the first radial stator (32) of the first radial magnetic bearing (30). The first thrust stator (52) is fixed to the inner peripheral surface of the body (10*a*). The first thrust rotor (51) faces the first thrust stator (52) with a gap therebetween in the axial direction.

A coil is provided in the first thrust stator (52). The first thrust stator (52) has a magnetic pole face that is substantially perpendicular to the axial direction. The first thrust rotor (51) has a magnetic pole face that is substantially perpendicular to the axial direction. The magnetic pole face of the first thrust stator (52) and the magnetic pole face of the first thrust rotor (51) face each other in the axial direction. When an electric current flows through the coil of the first thrust stator (52), an electromagnetic force in the axial direction is generated between the magnetic pole faces that face each other. Thus, the first thrust rotor (51) is pulled toward the one side in the axial direction with respect to the first thrust stator (52).

The second thrust magnetic bearing (60) pulls the shaft (15) toward the other side in the axial direction by using a magnetic attraction force. The second thrust magnetic bearing (60) is positioned on the other side in the axial direction relative to the motor rotor (12). To be more specific, the second thrust magnetic bearing (60) is positioned on the other side in the axial direction relative to the second radial rotor (41) of the second radial magnetic bearing (40). The second thrust magnetic bearing (60) includes a second thrust rotor (61) and a second thrust stator (62). The second thrust rotor (61) is positioned on the other side in the axial direction relative to the second radial rotor (41) of the second radial magnetic bearing (40). The second thrust rotor (61) is coaxially fixed to the shaft (15). The second thrust stator (62) is positioned on the other side in the axial direction of the second radial stator (42) of the second radial magnetic bearing (40). The second thrust stator (62) is fixed to the inner peripheral surface of the body (10*a*). The second thrust rotor (61) faces the second thrust stator (62) with a gap therebetween in the axial direction.

A coil is provided in the second thrust stator (62). The second thrust stator (62) has a magnetic pole face that is substantially perpendicular to the axial direction. The second thrust rotor (61) has a magnetic pole face that is substantially perpendicular to the axial direction. The magnetic pole face of the second thrust stator (62) and the magnetic pole face of the second thrust rotor (61) face each other in the axial direction. When an electric current flows through the coil of the second thrust stator (62), an electromagnetic force in the axial direction is generated between the magnetic pole faces that face each other. Thus, the second thrust rotor (61) is pulled toward the other side in the axial direction with respect to the second thrust stator (62).

The controller (70) outputs an electric-power command value (radial electric-power command value) for controlling electric power to be supplied to the first radial magnetic bearing (30) and the second radial magnetic bearing (40). The controller (70) outputs an electric-power command value (thrust electric-power command value) for controlling electric power to be supplied to the first thrust magnetic bearing (50) and the second thrust magnetic bearing (60). For example, the controller (70) includes a microcomputer and a program for operating the microcomputer.

The power supply unit (80) supplies electric power to each of the radial magnetic bearings (30, 40) and the thrust magnetic bearings (50, 60) based on the radial electric-power command value and the thrust electric-power command value from the controller (70). For example, the power supply unit (80) includes a pulse width modulation (PWM) amplifier.

The touchdown bearing (90) is provided to prevent contact between the stators (32, 42) and the rotors (31, 41) in the radial magnetic bearings (30, 40) and contact between the stators (52, 62) and the rotors (51, 61) in the thrust magnetic bearings (50, 60). In the present embodiment, one touchdown bearing (90) is provided in the wall (10b). Moreover, in the present embodiment, another touchdown bearing (90) is provided in the closing portion (10c). However, the number and the arrangement of the touchdown bearings are not limited to these. The touchdown bearing (90) is, for example, an angular ball bearing.

In a centrifugal compressor having the configuration described above, when the rotation speed of the impeller increases, the pressure in a space (the impeller chamber) on the one side in the axial direction relative to a base plate portion of the impeller decreases, and the pressure in a space on the other side in the axial direction relative to the base plate portion of the impeller increases. Therefore, a thrust load toward the one side in the axial direction is generated in the shaft. However, when bearings simply having the same configuration are used as the first thrust magnetic bearing and the second thrust magnetic bearing, it may not be possible to cancel the thrust load in a well-balanced manner. The centrifugal compressor (100) according to the present embodiment is devised in consideration of such a point.

Referring to FIG. 1, details of the configuration of the centrifugal compressor (100) according to the present embodiment will be described.

The present embodiment is configured so that the magnetic attraction force of the second thrust magnetic bearing (60) toward the other side in the axial direction is larger than the magnetic attraction force of the first thrust magnetic bearing (50) toward the one side in the axial direction. To be specific, the outside diameter of the second thrust rotor (61) of the second thrust magnetic bearing (60) is larger than the outside diameter of the first thrust rotor (51) of the first thrust magnetic bearing (50). To be more specific, in the present embodiment, the outside diameter of the second thrust rotor (61) of the second thrust magnetic bearing (60) is larger than the inside diameter of the motor stator (11). On the other hand, the outside diameter of the first thrust rotor (51) of the first thrust magnetic bearing (50) is smaller than the inside diameter of the motor stator (11).

As described above, the outside diameter of the second thrust rotor (61) of the second thrust magnetic bearing (60) is larger than the outside diameter of the first thrust rotor (51) of the first thrust magnetic bearing (50). Therefore, the controller (70) can easily perform control so that the magnetic attraction force of the second thrust magnetic bearing (60) toward the other side in the axial direction is larger than the magnetic attraction force of the first thrust magnetic bearing (50) toward the one side in the axial direction.

As described above, as the impeller (21) rotates, a thrust load toward the one side in the axial direction is generated in the shaft (15). With the present embodiment, the magnetic attraction force of the second thrust magnetic bearing (60) pulls the shaft (15) toward the other side in the axial direction, and the magnetic attraction force of the first thrust magnetic bearing (50) pulls the shaft (15) toward the one side in the axial direction with a magnetic attraction force that is weaker than the magnetic attraction force of the second thrust magnetic bearing (60). As a result, it is possible to cancel the thrust load of the shaft (15) in a well-balanced manner by using the magnetic attraction forces.

Moreover, in the present embodiment, the outside diameters of the motor rotor (12), the radial rotors (31, 41) of the radial magnetic bearings (30, 40), and the first thrust rotor (51) of the first thrust magnetic bearing (50) are each smaller than the inside diameter of the motor stator (11). Accordingly, it is possible to incorporate an assembly including the shaft (15), the first thrust rotor (51) of the first thrust magnetic bearing (50), the radial rotors (31, 41) of the radial magnetic bearings (30, 40), and the motor rotor (12) into the casing (10) from the other side in the axial direction. As a result, the centrifugal compressor (100) can be efficiently assembled.

The second thrust rotor (61) of the second thrust magnetic bearing (60) may be incorporated into the casing (10) from the other side in the axial direction in a state in which the second thrust rotor (61) and the assembly are attached to the shaft (15). Alternatively, after incorporating the assembly into the casing (10) from the other side in the axial direction, the second thrust rotor (61) may be attached to the shaft (15) from the other side in the axial direction.

Second Embodiment

Figure 2:
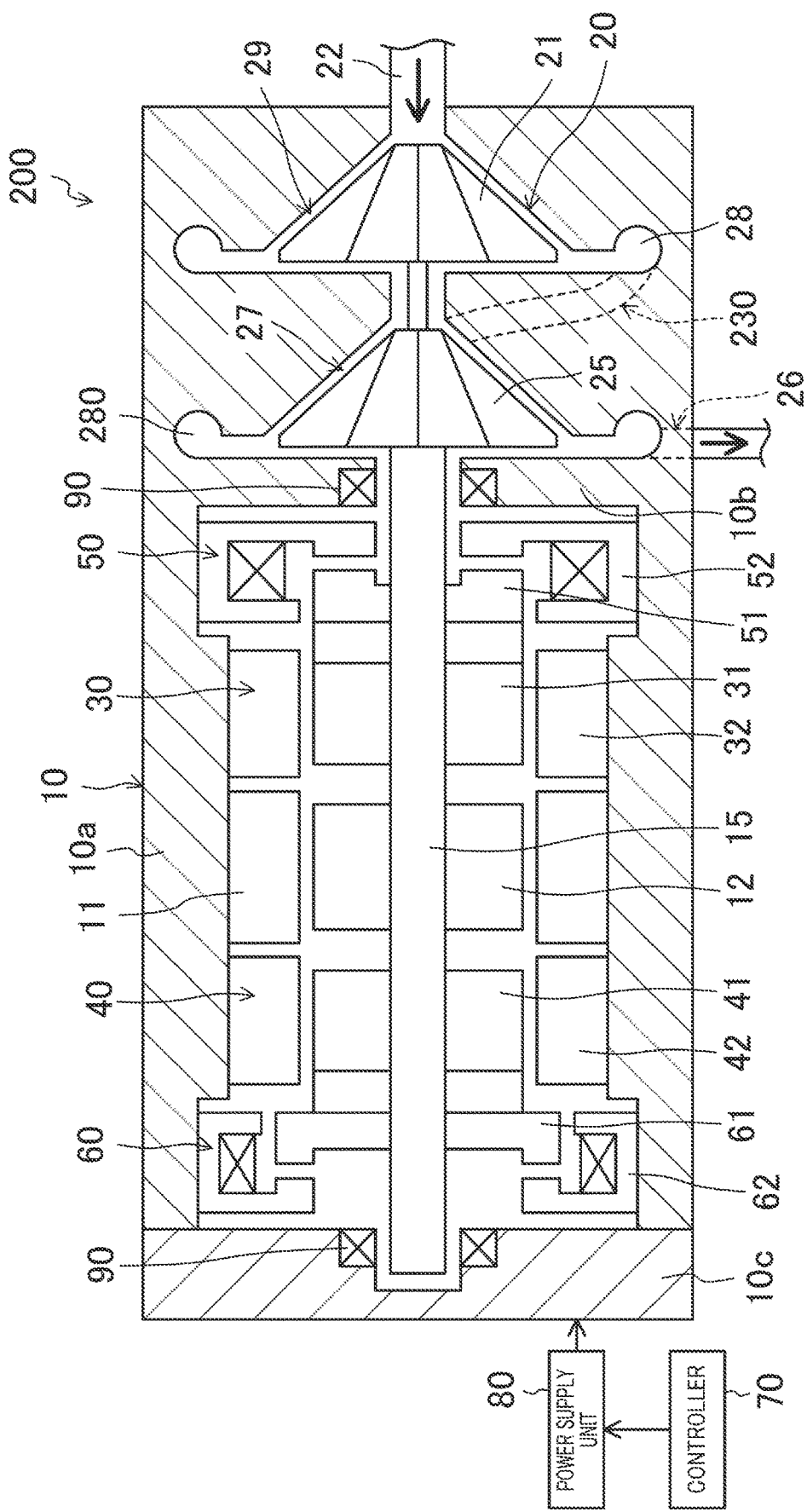
FIG. 2 is a schematic vertical sectional view of a compressor according to a second embodiment.

Referring to FIG. 2, a centrifugal compressor (200) according to the present embodiment will be described. FIG. 2 is a schematic vertical sectional view of the centrifugal compressor (200) according to a second embodiment.

The centrifugal compressor (200) according to the second embodiment differs from the centrifugal compressor (100) according to the first embodiment in that a compression unit (20) includes two impellers (21, 25). Hereafter, members having the same shapes and functions as those of the members described in the first embodiment will be denoted by the same numerals as in the first embodiment, and redundant descriptions of such members will be omitted.

The compression unit (20) of the centrifugal compressor (200) according to the second embodiment includes a first impeller (21), a second impeller (25), a first impeller chamber (29), and a second impeller chamber (27). Each of the first impeller (21) and the second impeller (25) has a substantially conical outer shape and includes a plurality of blades that are arranged in the circumferential direction.

The first impeller (21) is accommodated in a first impeller chamber (29) on the one side in the axial direction relative to the second impeller chamber (27) described below. A first suction pipe (22) and a first discharge pipe (230) are connected to the first impeller chamber (29). A first compression space (28) is formed in an outer peripheral portion of the first impeller chamber (29). The first suction pipe (22) is provided to guide a gas from the outside to the first impeller chamber (29). The first discharge pipe (230) is provided to guide a high-pressure gas compressed in the first impeller chamber (29) to the second impeller chamber (27). One end of the first discharge pipe (230) is connected to the first compression space (28). The other end of the first discharge pipe (230) is connected to an axial portion of the second impeller chamber (27).

The second impeller (25) is accommodated in the second impeller chamber (27) that is positioned between the wall (10b) and the first impeller chamber (29) in the axial direction. A second discharge pipe (26) is connected to the second impeller chamber (27). A second compression space (280) is formed in an outer peripheral portion of the second impeller chamber (27). One end of the second discharge pipe (26) is connected to the second compression space (280). A gas compressed in the first impeller chamber (29) passes through the first discharge pipe (230) and is guided to the second impeller chamber (27). The gas compressed in the second impeller chamber (27) is returned from the second compression space (280) to the outside through the second discharge pipe (26).

Also in the centrifugal compressor (200) having the configuration described above, the outside diameter of the second thrust rotor (61) of the second thrust magnetic bearing (60) is larger than the outside diameter of the first thrust rotor (51) of the first thrust magnetic bearing (50). Therefore, the controller (70) can easily perform control so that the magnetic attraction force of the second thrust magnetic bearing (60) toward the other side in the axial direction is larger than the magnetic attraction force of the first thrust magnetic bearing (50) toward the one side in the axial direction.

Therefore, when a large thrust load is generated in the shaft (15) as the first impeller (21) and the second impeller (25) rotate, the magnetic attraction force of the second thrust magnetic bearing (60) pulls the shaft (15) toward the other side in the axial direction, and the magnetic attraction force of the first thrust magnetic bearing (50) pulls the shaft (15) toward the one side in the axial direction with a magnetic attraction force that is weaker than the magnetic attraction force of the second thrust magnetic bearing (60). As a result, it is possible to cancel the thrust load of the shaft (15) in a well-balanced manner by using the magnetic attraction forces.

When the impellers (21, 25) are arranged in multiple stages on the one side in the axial direction of the shaft (15) as in the present embodiment, the differential pressure between a space (the second impeller chamber (27)) on the one side in the axial direction relative to the base plate portion of the impeller (25) that is furthest toward the other side in the axial direction and a space on the other side in the axial direction relative to the base plate portion of the impeller (25) that is furthest toward the other side in the axial direction is considerably large. Use of the configuration according to the present embodiment is particularly effective in such a case, because it is possible to cancel the thrust load of the shaft (15) in a well-balanced manner by using the magnetic attraction forces.

Heretofore, exemplary embodiments of the present disclosure have been described. However, the present disclosure is not limited to the embodiments described above.

In the embodiments described above, the magnetic attraction force of the second thrust magnetic bearing is made larger than the magnetic attraction force of the first thrust magnetic bearing by making the outside diameter of the second rotor of the second thrust magnetic bearing larger than the outside diameter of the first rotor of the first thrust magnetic bearing. However, in addition to or instead of the above, the magnetic attraction force of the second thrust magnetic bearing may be made larger than the magnetic attraction force of the first thrust magnetic bearing by adjusting the thrust electric-power command values from the controller.

In the embodiments described above, it is possible to incorporate an assembly including the shaft (15), the first rotor (51) of the first thrust magnetic bearing (50), the rotors (31, 41) of the radial magnetic bearings (30, 40), and the motor rotor (12) into the casing (10) from the other side in the axial direction. However, the assembly may include, in addition to the above, a non-magnetic ring and the like disposed on a middle part of the shaft in the axial direction.

Details of the configurations of elements and the layout of the elements may be different from those illustrated in the drawings of the present disclosure.

The invention claimed is:

1. A centrifugal compressor comprising:
   a casing having a tubular shape that extends in an axial direction;
   a motor stator fixed to an inside of the casing in a radial direction;
   a shaft disposed inside of the motor stator in the radial direction and extending in the axial direction;
   a motor rotor fixed to the shaft and facing the motor stator with a gap therebetween in the radial direction;
   a compression unit fixed to an end portion of the shaft on one side in the axial direction, the compression unit including at least one impeller;
   a first thrust magnetic bearing disposed between the motor rotor and the impeller in the axial direction; and
   a second thrust magnetic bearing disposed on an other side in the axial direction relative to the motor rotor,
   a magnetic attraction force of the second thrust magnetic bearing toward the other side in the axial direction is larger than a magnetic attraction force of the first thrust magnetic bearing toward the one side in the axial direction,
   the first thrust magnetic bearing including
      a first rotor coaxially fixed to the shaft, and
      a first stator fixed to an inside of the casing in the radial direction and positioned on the one side in the axial direction relative to the first rotor with a gap therebetween in the axial direction,
   the second thrust magnetic bearing including
      a second rotor coaxially fixed to the shaft, and
      a second stator fixed to an inside of the casing in the radial direction and positioned on the other side in the axial direction relative to the second rotor with a gap therebetween in the axial direction,
   an outside diameter of the second rotor being larger than an outside diameter of the first rotor,
   the outside diameter of the first rotor being smaller than an inside diameter of the motor stator, and
   the outside diameter of the second rotor being larger than the inside diameter of the motor stator.

2. The centrifugal compressor according to claim 1, wherein
   the compression unit includes at least two impellers.

3. A method of assembling the centrifugal compressor according to claim 1, the method comprising:
   incorporating an assembly including the shaft, the first rotor, and the motor rotor from the other side in the axial direction of the casing and subsequently attaching the second rotor to the assembly;
   or
   incorporating an assembly including the shaft, the first rotor, the motor rotor, and the second rotor from the other side in the axial direction of the casing.

* * * * *